US008924726B1

(12) United States Patent
Hodgman et al.

(10) Patent No.: US 8,924,726 B1
(45) Date of Patent: Dec. 30, 2014

(54) ROBUST MESSAGE ENCRYPTION

(75) Inventors: Roy Hodgman, Wenham, MA (US); Daniel Hassan, Ra'anana (IL)

(73) Assignee: EMC Corporation, Hopkinton, MA (US)

( * ) Notice: Subject to any disclaimer, the term of this patent is extended or adjusted under 35 U.S.C. 154(b) by 185 days.

(21) Appl. No.: 13/170,242

(22) Filed: Jun. 28, 2011

(51) Int. Cl.
*H04L 9/32* (2006.01)

(52) U.S. Cl.
USPC .............................. 713/170; 713/182; 380/243

(58) Field of Classification Search
CPC . G06F 9/466; G06F 11/0745; G06F 11/1474; G06F 17/602; G06F 17/604; G06F 2201/87; H04L 2209/56; H04L 2463/102; G06Q 20/202; G06Q 20/3223
USPC .................................. 713/170, 182; 380/243
See application file for complete search history.

(56) References Cited

U.S. PATENT DOCUMENTS

| 2007/0106895 | A1* | 5/2007 | Huang et al. | 713/170 |
| 2007/0192584 | A1* | 8/2007 | Bajar et al. | 713/150 |
| 2008/0195456 | A1* | 8/2008 | Fitzpatrick et al. | 705/9 |
| 2009/0283589 | A1* | 11/2009 | Moore et al. | 235/382 |
| 2012/0085818 | A1* | 4/2012 | Williams | 235/375 |
| 2012/0271712 | A1* | 10/2012 | Katzin et al. | 705/14.51 |
| 2012/0308003 | A1* | 12/2012 | Mukherjee | 380/243 |

FOREIGN PATENT DOCUMENTS

EP      1959374 A1    8/2008

* cited by examiner

*Primary Examiner* — Thuong Nguyen
(74) *Attorney, Agent, or Firm* — BainwoodHuang

(57) ABSTRACT

An improved technique involves generating an encoded representation of encrypted forms of a message which includes an institution's digital signature derived from the message. The institution sends the encoded representation to the user's computer. The user transfers an image of the encoded representation from the user's computer to a separate hand-held device. The user then derives the encrypted forms of the message and the institution's digital signature by decoding the image on the hand-held device; the user then decrypts the encrypted forms of the message and the institution's digital signature on the hand-held device. The user then sees the message without interference from an intrusive agent in a MitB attack. Further, the user can verify the institution's identity as the sender of the message by being able to validate the institution's digital signature. In this way, a MitB attack is very likely to be made apparent to the user.

12 Claims, 6 Drawing Sheets

ROBUST MESSAGE ENCRYPTION

BACKGROUND

Conventional systems for carrying out electronic business over the Internet use an encryption scheme to reduce the risk of exposing personally identifiable information (PII) to unwanted third parties. An example of such an encryption scheme is public key/private key encryption. In public key/private key encryption, a partner with which a business client wishes to conduct a business dealing sends the business client a public key. The business client encrypts messages pertaining to the electronic business using the public key and sends the encrypted messages to the partner through an Internet browser. The partner, having a unique private key paired with the public key, is able to decrypt the messages and conduct the business.

The conventional system allows the partner to send the business client a summary of the business details as conducted by the partner. The business client can then confirm that the partner correctly conducted the business specified in the messages by reading the summary in a window of the Internet browser on a display. Typically, the partner encrypts the summary of the business details using a public key generated by the business client; this summary is then decrypted, at the TLS Layer, using a corresponding private key.

SUMMARY

Unfortunately, the above-described conventional system leaves electronic business dealings between a business client and a partner vulnerable to Man-In-The-Browser (MitB) attacks. In a MitB attack, an intrusive agent is installed on the business client as a script on the Internet browser. The intrusive agent intercepts messages before they have been encrypted. The intrusive agent also intercepts summaries of business details after they have been decrypted but before they have been displayed to the business client's screen. The intrusive agent is thus able to alter data coming into and leaving the business client without the client or the partner detecting any changes.

For example, suppose that a business client wishes to complete an electronic transfer of $100 from the client's Savings Account to External Account A. Before the business data is encrypted, the intrusive agent in the Internet browser alters the business data to specify that a transfer of $300 from the client's Savings Account to External Account B, which is an account controlled by an unwanted third party responsible for the intrusive agent. The intrusive agent then releases the altered electronic business data encrypts it and sent over the Internet to the partner for decryption and processing.

A MitB attack further stymies an important security aspect of the conventional system: sending the client a summary of the transfer. Under ideal circumstances, the client would be able to detect the change from the original transfer from the transfer summary, as the summary would list the $300 transfer to External Account B rather than the intended $100 transfer to external Account A. In a MitB attack, however, the intrusive agent can alter the transfer summary, even when the summary is encrypted, to reflect the intended transfer rather than the transfer actually carried out, thus frustrating immediate detection.

In contrast to the conventional system which is vulnerable to MitB attacks, an improved technique involves generating an encoded representation of encrypted forms of a message which includes an institution's digital signature derived from the message. The institution sends the encoded representation to the user's computer. The user transfers an image of the encoded representation from the user's computer to a separate hand-held device. The user then derives the encrypted forms of the message and the institution's digital signature by decoding the image on the hand-held device; the user then decrypts the encrypted forms of the message and the institution's digital signature on the hand-held device. The user then sees the message without interference from an intrusive agent in a MitB attack. Further, the user can verify the institution's identity as the sender of the message by being able to validate the institution's digital signature. In this way, a MitB attack is very likely to be made apparent to the user.

One embodiment of the improved technique is directed to a computer-implemented method of securely conveying a message to a user. The method includes encrypting the message and generating a digital signature based on the message to form encrypted data. The method also includes generating a representation which includes the encrypted data. The method further includes providing the representation to an output terminal constructed and arranged to render the representation to the user to form a rendered representation, the user being enabled to acquire the encrypted data from the representation.

Additionally, some embodiments of the improved technique are directed to a system for securely conveying a message to a user. The system includes a network interface coupled to a network, a memory and a processor coupled to the memory, the processor configured to carry the method of securely conveying a message to a user.

Furthermore, some embodiments of the improved technique are directed to a computer program product having a non-transitory computer readable storage medium which stores code including a set of server instructions to carry the method of securely conveying a message to a user.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique involves generating an encoded representation of encrypted forms of a message which includes an institution's digital signature derived from the message. The institution sends the encoded representation to the user's computer. The user transfers an image of the encoded representation from the user's computer to a separate hand-held device. The user then derives the encrypted forms of the message and the institution's digital signature by decoding the image on the hand-held device; the user then decrypts the encrypted forms of the message and the institution's digital signature on the hand-held device. The user then sees the message without interference from an intrusive agent in a MitB attack. Further, the user can verify the institution's identity as the sender of the message by being able to validate the institution's digital signature. In this way, a MitB attack is very likely to be made apparent to the user.

Figure 1:
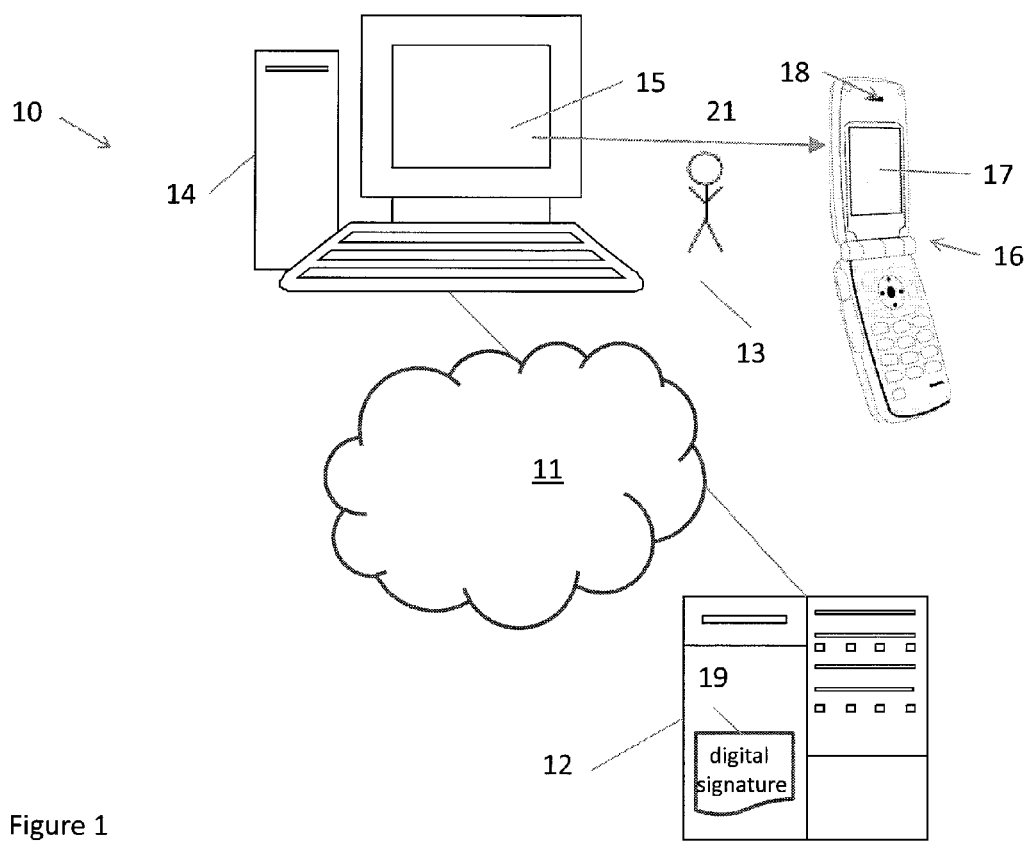
FIG. 1 is a schematic diagram illustrating an electronic environment for carrying out the improved technique.

FIG. 1 shows an electronic environment 10 which is suitable for use by the improved technique. Electronic environment 10 includes communications medium 11, institutional server 12, client computer 14 and mobile device 16.

Communication medium 11 provides connections between institutional server 12 and client computer 14. The communications medium 11 may implement a variety of protocols such as TCP/IP, UDP, ATM, Ethernet, Fibre Channel, combinations thereof, and the like. Furthermore, the communications medium 11 may include various components (e.g., cables, switches/routers, gateways/bridges, NAS/SAN appliances/nodes, interfaces, etc.). Moreover, the communications medium 11 is capable of having a variety of topologies (e.g., queue manager-and-spoke, ring, backbone, multi drop, point to-point, irregular, combinations thereof, and so on).

Client computer 14 provides to a user 13 the ability to construct, send and receive messages. Client computer 14 includes an output device 15 such as a monitor, on which client computer 14 renders visual and other representations of received messages. An example of such a message is a request to perform a transaction. Typically, client computer 14 processes such a transaction request within a web browser application.

Institutional server 12 is constructed and arranged to process messages received from client computer 14 through communication medium 11. Continuing the above example, institution server 12 processes transaction requests from client computer 14. Specifically, an institution to which institution server 12 belongs is a bank, and an example of a transaction requests is a transfer of funds from an account of the user 13 within the bank to some other external account.

Mobile device 16 is accessible to user 13 while client computer 14 renders a representation of a message from institutional server 12. Mobile device 16 includes an image acquisition device 18 which is constructed and arranged to acquire an image of the representation of the message. Typically, the acquisition of the image is performed outside of communication medium 11. Continuing the above example, when output device 15 is a monitor, image acquisition device 18 is a camera which acquires an image of the representation. Mobile device 16 further includes an output device 17 which, in the case of the example above, is a display on which user 13 views the image.

To further illustrate the improved technique during operation, the above example is examined in further detail. Suppose that user 13 desires to complete an electronic transaction involving a transfer of $100 from the user's Savings Account to External Account A. The user 13 sends a message in the form of a request, through a web browser running on client computer 14, to process the electronic transaction. Institutional server 12 subsequently receives a request to process an electronic transaction.

Before institutional server 12 processes the transaction, however, institutional server 12 encrypts a message which includes data from the request and forms encrypted data with the encrypted message and a digital signature 19 which uniquely identifies institutional server 12. In the example described below, digital signature 19 is generated using a private key associated with institutional server 12. Institutional server 12 then generates an encoded representation of the encrypted data. For example, the encoded representation can take the form of a set of pixels, as in a picture. Institutional server 12 sends a message which includes the encoded representation to client computer 14 over communication medium 11.

Upon receiving the message over communication medium 11, client computer 14 extracts the encoded representation and renders it to output device 15. In the case of the representation being a picture, on the other hand, output device 15 is a monitor which visually displays the picture.

User 13 performs a transfer 21 of the encoded representation to mobile device 16 using image acquisition device 18. At this point, no decryption of the transaction data or verification the digital signature has been performed. When the encoded representation is a picture, image acquisition device 18 is a camera which acquires an image of the picture and places it onto memory of the mobile device 16.

Mobile device 16 then decodes the encoded representation to obtain the encrypted data which in turn includes the encrypted message (e.g., transaction data) and the digital signature. In the case of the encoded representation being a picture, the mobile device 16 maps each pixel to a set of bits and arranges the resulting sets of bits to reveal the encrypted transaction data and the digital signature.

Mobile device 16 then decrypts the encrypted transaction data and verifies the digital signature. In the example described below, the verification is performed with a public key associated with institutional server 12. The user 13 is then able to see the decrypted transaction data as received at the institutional server 12, as well as verify that the data originated from the institutional server 12. If the transaction request which the user 13 sent to institutional server 12 was altered by an intrusive agent, it will be apparent in the decrypted message. Continuing with the example, if the user's original request was modified to indicate that the electronic transaction involves a transfer of $300 from the user's Savings Account to External Account B, user 13 will be able to see the alteration and take appropriate action.

An advantage of the improved technique lies in the encoded representation of the encrypted transaction data and the digital signature. The encoding need not be proprietary; in fact, the encoding scheme is preferably in the public domain. That said, because the decryption does not take place on client computer 14, an intrusive agent will not be able to make use of the transaction data. Therefore, even if the intrusive agent could decode the encoded representation, it would have no incentive to do so as the intrusive agent would not be able to decrypt the message. The encoded representation is well-suited to the improved technique because client computer 14 can transfer the encoded representation from the client computer 14 to the mobile device 16 outside of communication medium 11. Transferring the encoded representation in this manner greatly reduces risks inherent to connecting client computer 14 to institutional server 12.

A further advantage of the improved technique lies in the use of the digital signature 19. The digital signature 19 virtually guarantees that the originator of the encrypted representation is the institutional server 12 and not a sophisticated intrusive agent which generates encrypted representations.

Additional detail of how institutional server 12 generates encrypted representations to be encoded and then transferred to mobile device 16 will be explained in regard to FIGS. 2(*a*) and 2(*b*).

Figure 2A:
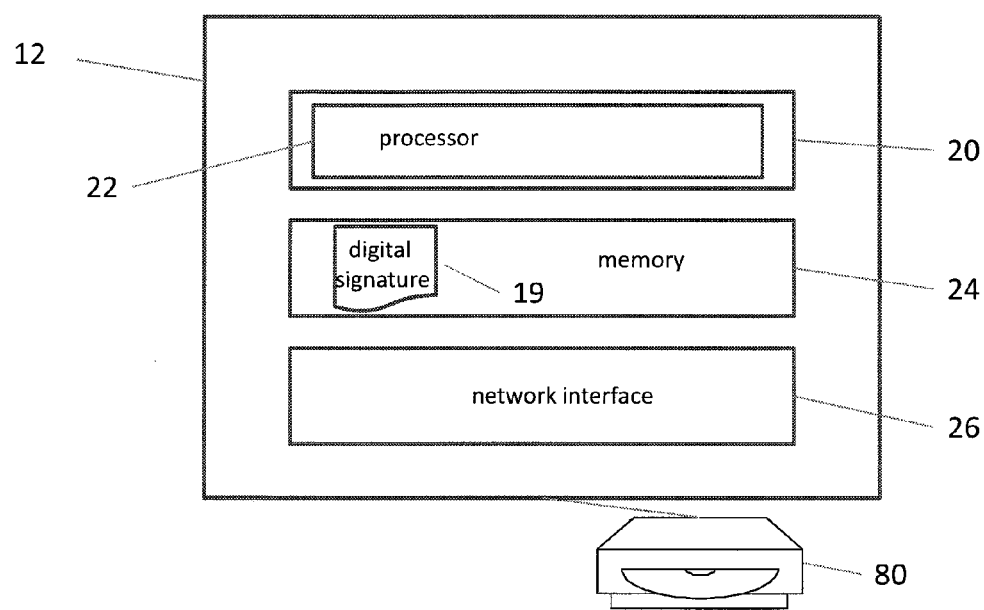
FIG. 2(a) is a schematic diagram of an institution server within the electronic environment illustrated in FIG. 1.
Figure 2B:
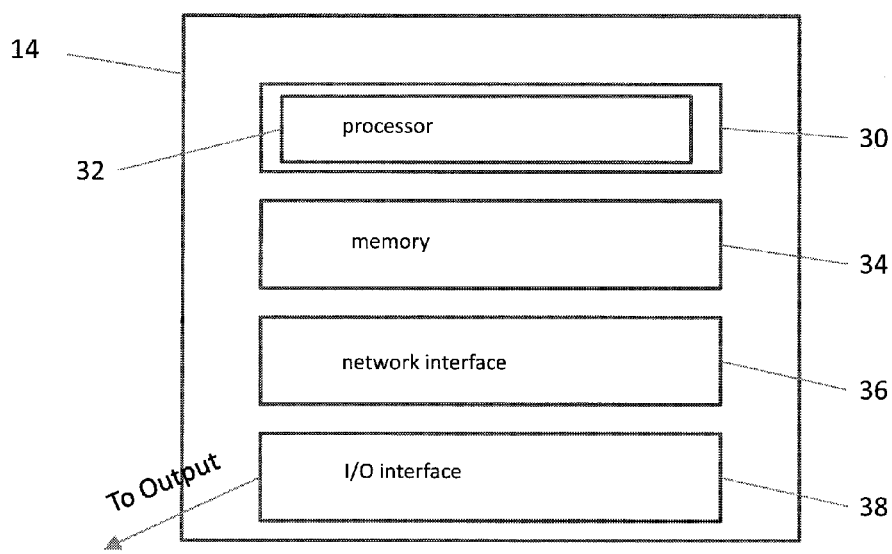
FIG. 2(b) is a schematic diagram of a user's computer within the electronic environment illustrated in FIG. 1.

FIG. 2(*a*) shows further detail of institutional server 12. Institutional server 12 includes a controller 20 which in turn includes processor 22. Institutional server 12 also includes memory 24 and network interface 26.

Memory 24 is configured to store a computer program 80 which is constructed and arranged to securely convey a message to user 13 through a combination of encryption and encoding of transaction data, as well as store digital signature 19. Memory 24 generally takes the form of, e.g., random access memory, flash memory or a non-volatile memory.

Processor 22 can take the form of, but is not limited to, an Intel or AMD-based MPU, and can be a single or multi-core running single or multiple threads. Processor 22 is coupled to memory 24 and is configured to execute the computer program 80 stored in memory 24.

Network interface 26 is constructed and arranged to send and receive data over communications medium 11. Specifically, network interface 26 is configured to receive transaction data from and send messages to client computer 14 over communications medium 11. In some arrangements, network interface 26 is constructed and arranged to send data directly to mobile device 16 over a wireless connection such as a cell phone connection.

FIG. 2(*b*) shows further detail of client computer 14. Client computer 14 includes a controller 30 which in turn includes processor 32. Client computer 14 also includes memory 34, network interface 36 and input/output (I/O) interface 38.

Memory 34 is configured to store a web browser program which is constructed and arranged to access institutional server 12 and send and receive data from institutional server 12 over communications medium 11. Memory 34 is further configured to store messages received over communications medium 11. Memory 34 generally takes the form of, e.g., random access memory, flash memory or a non-volatile memory.

Processor 32 can take the form of, but is not limited to, an Intel or AMD-based MPU, and can be a single or multi-core running single or multiple threads. Processor 32 is coupled to memory 34 and is configured to execute the web browser program stored in memory 34.

Network interface 36 is constructed and arranged to send and receive data over communications medium 11.

During operation, user 13 runs web browser software on processor 32 and initiates a login session to access an account such as user's Savings Account via institutional server 12. Upon a successful login, institutional server 12 sends a web page to client computer 14 containing a form in which user 13 inputs transaction data such as a request to transfer $100 from the user's Savings Account to External Account A. User 13 then submits the completed form by, e.g., clicking on a "submit" button on the web page.

It is possible for an intrusive agent to reside in memory 34 in the form of a computer program which runs via the browser software. An example of such an intrusive agent is a malicious javascript program which user 13 unknowingly installed when clicking on a button in a phishing site. The intrusive agent, if active, intercepts the transmission of the transaction data and changes the data so that the electronic transaction involves a transfer of $300 from the user's Savings Account to External Account B. Once the change is made, the transmission commences.

Upon receipt of the transaction data over network interface 26, institutional server 12 stores the transaction data in memory 24. Using computer program 80, processor 22 runs an algorithm which encrypts transaction data and creates a digital signature 19 for the encrypted data which is stored in memory 24.

It should be understood that an encryption scheme allows for a corresponding decryption at a remote point, without loss of information. In some arrangements, such an encryption scheme involves the generation of a public key/private key pair at the point of decryption. That is, institutional server 12 sends, via the cell phone connection and prior to the submission of the transaction data, an application to mobile device 16 which generates a public key/private key pair and which includes a copy of institutional server 12's public key. User 13 then sends, via the cell phone connection, the public key of the mobile device to institutional server 12. The encrypting of the transaction data on institutional server 12 then involves encrypting the transaction data using the public key of the mobile device 16.

It should also be understood that, as the purpose of the digital signature 19 is verification, encryption of the digital signature 19 is to be accomplished using, in some arrangements, a private key generated within a public key/private key pair on institutional server 12. In this case, the public key of institutional server 12 is sent to mobile device 12 over the cell phone connection after the application described above is provisioned to mobile device 16.

Once the transaction data is encrypted and the digital signature is generated on the encrypted data using private key 19, computer program 80 then encodes the encrypted transaction data and digital signature into, in some arrangements, a picture. As described above, a purpose of converting the data into a picture is to provide a vehicle for an out-of-band transfer of the data to a device on which the intrusive agent cannot act.

Figure 3:
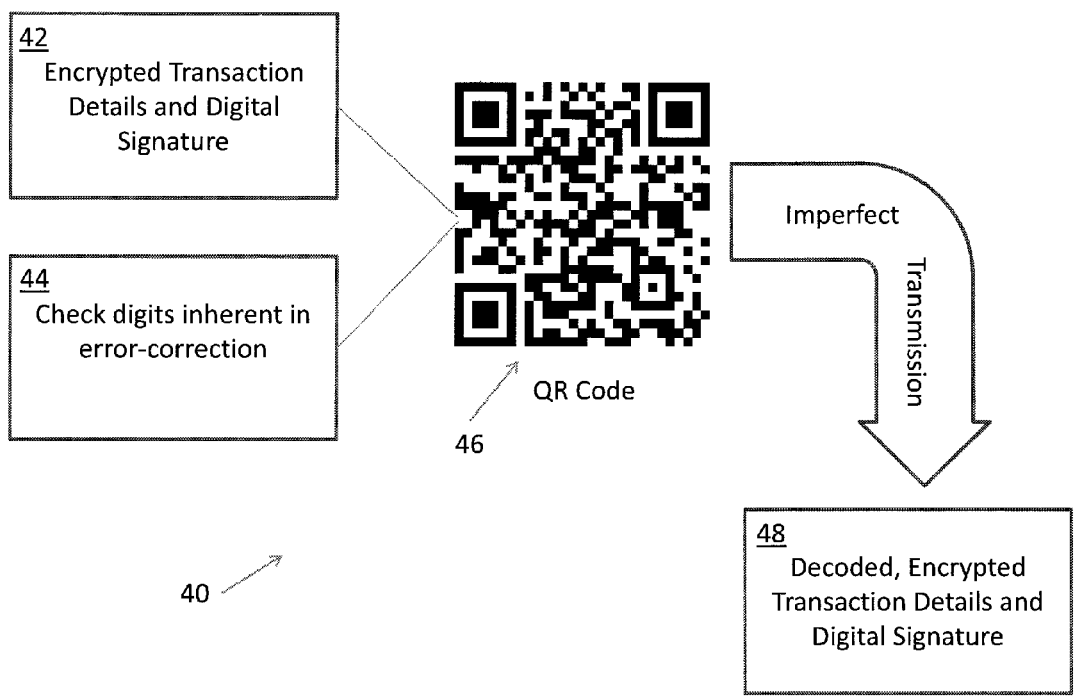
FIG. 3 is a schematic diagram of an encoding process for the case of a QR code, the image of which appears as a visual output of the user's computer of FIG. 2(b)

FIG. 3 shows a preferred encoding 40 of the encrypted transaction data and digital signature 42 into a QR Code 46. QR Codes are a well-known representation of data which is transferred by scanning devices on mobile phones and other devices. An advantage of using QR codes over other pictorial arrangements is in its inherent error-correcting properties. If there is an error in the scanning process, due to, e.g., imperfections in the camera lens, atmospheric turbulence, etc., the QR code contains redundancies which allow for lost data to be recovered. Further, QR codes are well-suited for the encrypted transaction data and digital signature because they can encode up to 2,953 bytes of data. Larger data sets can be encoded with multiple QR Codes.

Processor 22 then stores the encrypted transaction data and digital signature 42 in memory 24. Processor 22 then runs computer program 80 to encode the encrypted data 42 into a QR Code 46. In encoding the encrypted data 42 into QR code 46, processor 22 builds error correcting properties 44 into the resulting QR code 46, which error correcting properties are inherent to the encoding. QR Code 46 is sent to client computer 14 via communications medium 11, where it is displayed on monitor 15.

Once QR Code 46 is displayed on monitor 15, mobile device 16 scans the image of QR Code 46 with camera 18 and in doing so, transfers the image of QR Code 46 onto mobile device 16. Mobile device 16 has an application which decodes QR Code 46 into decoded encrypted transaction data and digital signature 48. In most cases, encrypted data 48 will be identical to encrypted data 42 because of the error-correcting capabilities inherent in QR Codes. Nevertheless, there is a small chance that the errors in transmission were too significant for error-correction. In such a case, user 13 would generate another transaction request.

Once the encrypted transaction data and digital signature have been decoded, mobile device 16 uses the private key of the mobile device 16 to decrypt the transaction data and the public key of the institutional server 12 to verify the digital signature. The transaction data and the veracity of the digital signature are then displayed on display 17 for user 13 to view. If the transaction data is different than that which user 13 sent or if the digital signature is invalid, then user 13 notifies the institution and performs the transaction in an alternative forum, e.g., on a different computer, over the phone or in person.

In some arrangements, institutional server 12 generates a unique confirmation code which corresponds to the transaction request and is encrypted with the transaction data. The confirmation code is decrypted with the encrypted transaction data and is displayed on display 17. If user 13 is satisfied that the decrypted transaction data is identical to the submitted transaction data, then user 13 inputs the confirmation code into a web page running on processor 32 and submits the confirmation to institutional server 12. Upon receipt of the correct confirmation code, institutional server processes the requested transaction.

Figure 4:
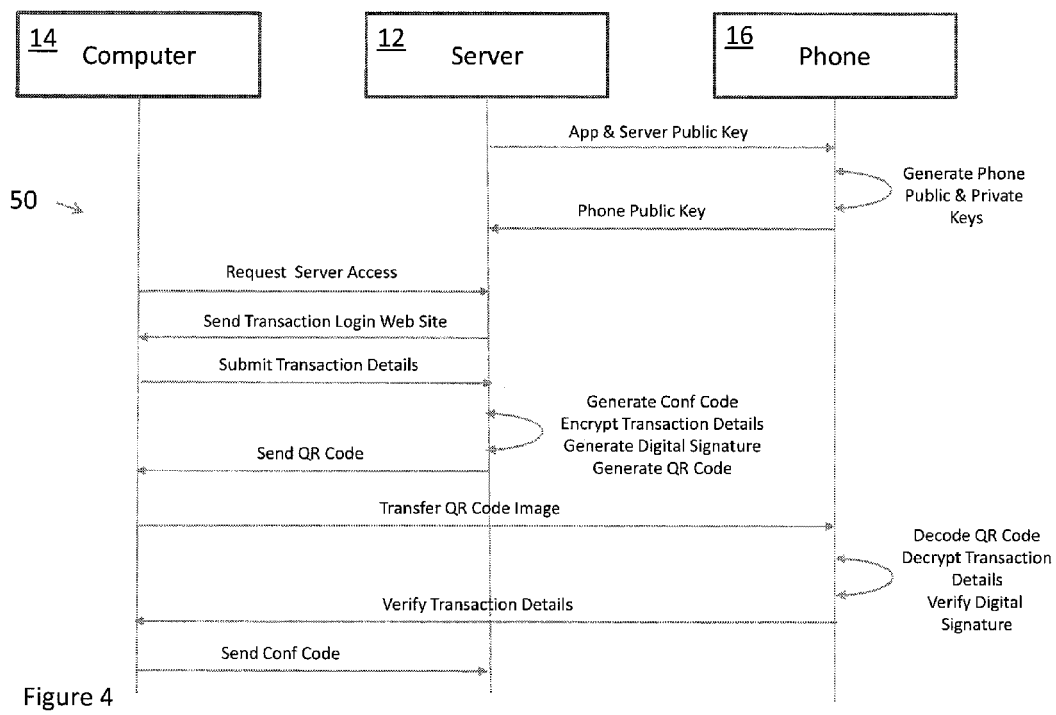
FIG. 4 is a sequence diagram illustrating the improved technique carried out within the electronic environment illustrated in FIG. 1.

FIG. 4 shows a sequence diagram 50 which illustrates a sequence of events resulting in a processed transaction as described above. Institutional server 12 sends a key generation application and the public key of institutional server 12 to mobile device 16. Mobile device generates, with the application, a public key/private key pair, stores the private key of mobile device 16 and public key of institutional server 12 in memory and sends the public key of mobile device 16 to institutional server 12, whereupon public key of mobile device 16 is stored in memory 24.

User 13 at client computer 14 submits a request to access institutional server 12, which in turn sends client computer a login page. Upon a successful login, user 13 at client computer 14 submits a request to process an electronic transaction to institutional server 12, the request including transaction data.

Upon receipt of the transaction data, institutional server 12 generates a confirmation code which it adds to the transaction data. Institutional server 12 then encrypts the transaction data and confirmation code with the public key of the mobile device 16 and generates a digital signature 19 for the encrypted data with private key of the institutional server 12. Once the encryption is complete, institutional server generates from the encrypted transaction data and the digital signature a QR code which it sends to client computer 14.

Client computer 14, upon receipt of the QR Code, transfers the QR Code to mobile device 16 via scanning an image of the QR Code on display 15.

Upon receipt of the scanned QR Code image, mobile device 16 runs an application which decodes the QR Code to produce an encrypted transaction data and digital signature. Mobile device 16 then decrypts the transaction data with the private key of mobile device 16 and verifies the digital signature with the public key of the institutional server 12. Mobile device 16 then displays transaction data on display 17, including the confirmation code, and performs a verification operation on digital signature 16 and provides user 13 with a verification result.

If the displayed transaction data is identical to the submitted transaction data and if the verification result denotes a valid digital signature, then user 13 inputs the confirmation code into a web page and submits the web page to institutional server 12. Institutional server 12 processes the transaction if the confirmation code it receives from client computer 14 is valid.

Figure 5:
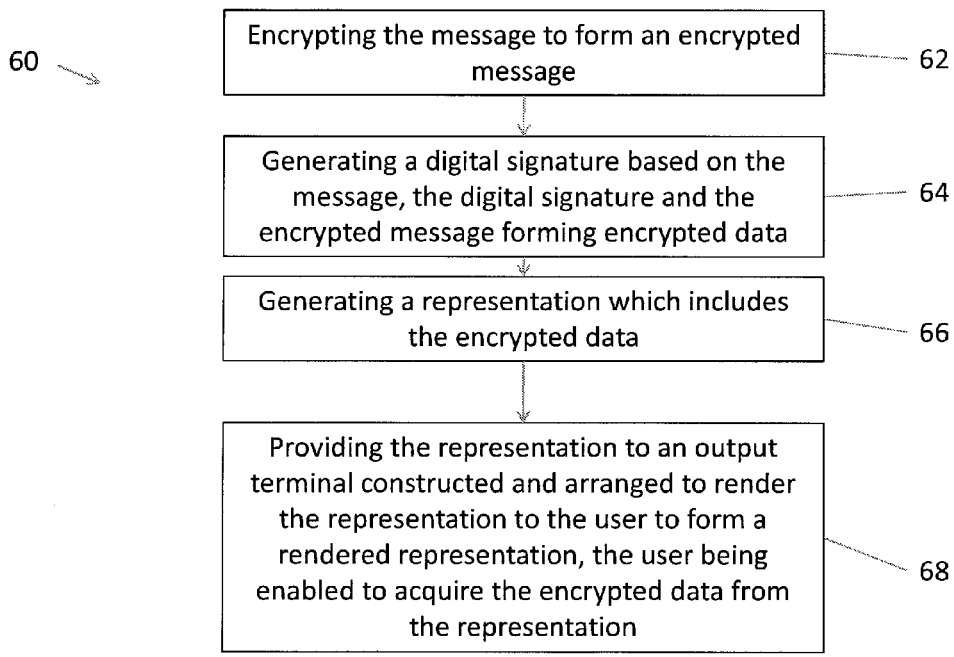
FIG. 5 is a flow chart illustrating a method for carrying out the improved techniques within the electronic environment illustrated in FIG. 1.

FIG. 5 illustrates a method 60 for securely conveying a message to a user. In step 62, the message is encrypted to form encrypted data. In step 64, a digital signature is computed to form a digital signature. In step 66, a representation which includes the encrypted data and the digital signature is generated. In step 68, the representation is provided to an output terminal constructed and arranged to render the representation to the user to form a rendered representation such that the user is enabled to acquire the encrypted data and the digital signature from the representation.

While various embodiments of the invention have been particularly shown and described, it will be understood by those skilled in the art that various changes in form and details may be made therein without departing from the spirit and scope of the invention as defined by the appended claims.

For example, the representation can take the form of an image other than a QR Code such as a 2D barcode, a 1D barcode or a photographic image. For example, images such as Aztec Code, Datamatrix, EZCode, MaxiCode, PDF417 also contain error-correcting properties. Further, the representation can take the form of an audio signal such as a series of chirps of a predetermined sequence of frequencies or a song. The representation can also be tactile as in a series of vibrations. In the case of the representation being an audio segment, the output device 15 is a speaker which plays the audio segment.

The message transmitted need not be with regard to a banking transaction. The improved technique described above can also be applied to, e.g., medical transactions such as prescription refills or release of medical records to a third party.

Mobile device 16 need not be a cell phone. In other arrangements, mobile device 16 can be a laptop computer, a personal digital assistant, a netbook, a tablet computer, etc. Further, client computer 14 can be a laptop computer, a personal digital assistant, a netbook, a tablet computer, etc.

The application which generates public/private key pairs on mobile phone 16 can also be used to decode QR Code 46, or a separate, public domain application can be used to decode QR Code 46.

Furthermore, it should be understood that some embodiments are directed to institutional server 12 which securely conveys a message to a user. Some embodiments are directed to institutional server 12. Some embodiments are directed to a system which securely conveys a message to a user. Some embodiments are directed to a process of securely conveying a message to a user. Also, some embodiments are directed to a computer program product which enables computer logic to perform the securely conveying of a message to a user.

In some arrangements, institutional server 12 is implemented by a set of processors or other types of control/processing circuitry running software. In such arrangements, the software instructions can be delivered to institutional server 12 in the form of a computer program product (illustrated generally by code for computer program 80 stored within memory 24 in FIG. 2(*a*)) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of processing a transaction, the method comprising:

in response to a computing device having received entered transaction details, receiving, from the computing device by a server, a request to process a transaction, the request including output transaction details;

encrypting the output transaction details to form encrypted transaction details;

generating a graphical image representation of the encrypted transaction details;

sending the graphical image representation to the computing device, the encrypted transaction details being obtained from the graphical image representation by a second computing device via the computing device and subsequently decrypted by the second computing device to form decrypted output transaction details, the second computing device being distinct from the first computing device;

receiving, from the computing device, a message containing an indication whether the decrypted output transaction details match the entered transaction details, wherein receiving the message containing the indication includes receiving the message after the decryption of the encrypted transaction details by the second device; and processing, by the server, the transaction in response to the indication indicating that the decrypted output transaction details match the entered transaction details.

2. The method as in claim 1, wherein the method further comprises, prior to encrypting the message:

sending, to the second computing device, an application configured to generate a pair of a public key and a private key associated with the second computing device, wherein the private key associated with the second computing device is configured to decrypt data encrypted with the public key associated with the second computing device;

receiving the public key associated with the second computing device;

wherein encrypting the transaction details includes encrypting the transaction details using the public key associated with the second computing device.

3. The method as in claim 1, wherein generating the graphical image representation includes:

generating a QR code from the encrypted transaction details; and wherein the computing device includes an electronic display device configured to display an image of the QR code upon receipt of the QR code by the computing device, and the second computing device includes a scanning device constructed and arranged to transfer the image of the QR code from the electronic display device to the second computing device.

4. The method as in claim 3, wherein the method further comprises, prior to encrypting the message:

generating a confirmation code operative to be input into the computing device after the decryption of the output transaction details by the second computing device, and attaching the confirmation code to the transaction details;

wherein receiving the message includes:

obtaining the confirmation code from the message, receipt of the confirmation code indicating that the decrypted output transaction details match the entered transaction details.

5. The method as in claim 1, further comprising:

comparing a data size of the encrypted transaction details to a data capacity of the graphical image representation;

if the data size of the encrypted transaction details is smaller than or equal to the data capacity of the graphical image representation, providing a single representation to the computing device; and if the data size of the encrypted transaction details is greater than the data capacity of the graphical image representation, providing multiple representations to the computing device, each representation of the multiple representation including at least a portion of the encrypted transaction details.

6. The method as in claim 1, further comprising:

receiving, from the first computing device, another message containing an indication that other transaction details of another transaction obtained from another graphical image representation by the second computing device and subsequently decrypted by the second computing device differ from other intended transaction details input into the computing device; and not processing the other transaction in response to receiving the indication.

7. A system constructed and arranged to securely convey a message to a user process a transaction, the system comprising:

a server including:

a network interface;

a memory; and a controller which includes controlling circuitry which is coupled to the memory, the controlling circuitry constructed and arranged to:

in response to entered transaction details being input, receive a request to process a transaction, the request including output transaction details;

encrypt the output transaction details to form encrypted transaction details;

generate a graphical image representation of the encrypted transaction details;

receive a message containing an indication whether decrypted output transaction details match the entered transaction details, wherein receiving the message containing the indication includes receiving the message after the decryption of the encrypted transaction details by the second device; and process the transaction in response to the indication indicating that the decrypted output transaction details match the entered transaction details; and a computing device including:

a network interface;

a memory; and a controller which includes controlling circuitry which is coupled to the memory, the controlling circuitry constructed and arranged to:

take in, as input, the entered transaction details;

send the request to process the transaction to the server;

receive, from the server, the graphical image representation generated by the server, the encrypted transaction details being obtained from the graphical image representation by a second computing device via the computing device and subsequently decrypted by the second computing device to form the decrypted output transaction details, the second computing device being distinct from the first computing device; and send, to the server, the message containing the indication.

8. The system as in claim 7, wherein the controlling circuitry of the server is further constructed and arranged to, prior to encrypting the message:

send, to the second computing device, an application configured to generate a pair of a public key and a private key associated with the second computing device, wherein the private key associated with the second computing device is configured to decrypt data encrypted with the public key associated with the second computing device; and receive the public key associated with the second computing device;

wherein encrypting the output transaction details includes encrypting the transaction details using the public key associated with the second computing device;

wherein the controlling circuitry of the second device is further constructed and arranged to:

generate the public key and the private key associated with the second device; and wherein decrypting the encrypted transaction details includes decrypting the encrypted transaction details using the private key associated with the second device.

9. The system as in claim 7, wherein generating the representation further includes:

generating a QR code from the encrypted transaction details; and wherein the computing device further includes an electronic display device configured to display an image of the QR code upon receipt of the QR code; and wherein the second computing device further includes a scanning device constructed and arranged to transfer the image of the QR code from the electronic display device of the computing device to the second computing device.

10. The system as in claim 9, wherein the controlling circuitry of the server is further constructed and arranged to, prior to encrypting the message:

generate a confirmation code operative to be input into the computing device after the decryption of the output transaction details by the second computing device, and attach the confirmation code to the output transaction details decrypted by the second computing device;

wherein receiving the message includes:

obtaining the confirmation code from the message, receipt of the confirmation code indicating whether the decrypted output transaction details match the entered transaction details;

wherein sending the message containing the indication includes sending the confirmation code to the server.

11. A computer program product having a non-transitory computer readable storage medium which stores a set of instructions to process a transaction, the set of instructions, when carried out by a server, causing the server to:

in response to a computing device having received entered transaction details, receive, from the computing device, a request to process a transaction, the request including output transaction details;

encrypt the output transaction details to form encrypted transaction details;

generate a graphical image representation of the encrypted data transaction details;

send the graphical image representation to the computing device, the encrypted transaction details being obtained from the graphical image representation by a second computing device via the computing device and subsequently decrypted by the second computing device to form decrypted output transaction details, the second computing device being distinct from the first computing device;

receive, from the computing device, a message containing an indication whether the decrypted output transaction details match the entered transaction details, wherein receiving the message containing the indication includes receiving the message after the decryption of the encrypted transaction details by the second device; and process the transaction in response to the indication indicating that the decrypted output transaction details match the entered transaction details.

12. The computer program product as in claim 11, wherein the set of instructions further cause the server to, prior to encrypting the message:

send, to the second computing device, an application configured to generate a pair of a public key and a private key associated with the second computing device, wherein the private key associated with the second computing device is configured to decrypt data encrypted with the public key associated with the second computing device;

receive the public key associated with the second computing device;

wherein encrypting the output transaction details includes encrypting the output transaction details using the public key associated with the second computing device.

* * * * *